United States Patent [19]

Glass

[11] Patent Number: 4,917,488

[45] Date of Patent: Apr. 17, 1990

[54] PHOTOCELL DISTANCE MEASUREMENT

[75] Inventor: William H. Glass, Edina, Minn.

[73] Assignee: Management Graphics, Inc., Bloomington, Minn.

[21] Appl. No.: 298,784

[22] Filed: Jan. 17, 1989

Related U.S. Application Data

[63] Continuation of Ser. No. 1,205, Jan. 7, 1987, abandoned.

[51] Int. Cl.$^4$ ............................................. G01C 3/08
[52] U.S. Cl. ........................................ 356/4; 358/107
[58] Field of Search ............................ 356/4; 358/107

[56] References Cited

U.S. PATENT DOCUMENTS

| | | | |
|---|---|---|---|
| 2,206,036 | 7/1940 | Herson | 356/4 |
| 3,744,906 | 7/1973 | Sato et al. | 356/4 |
| 3,815,994 | 6/1974 | Peckham | 356/4 |
| 3,843,839 | 10/1974 | Campbell et al. | 178/6 |
| 3,899,251 | 8/1975 | Frenk et al. | 356/4 |
| 3,952,144 | 4/1976 | Kolker | 178/6 |
| 4,003,651 | 1/1977 | Hashida et al. | 355/16 |
| 4,095,248 | 6/1978 | Kolker et al. | 358/288 |
| 4,290,085 | 9/1981 | Kolker | 358/264 |

OTHER PUBLICATIONS

Japanese Patent Abstract, vol. 7, No. 6 (P-182) [1205], Mar. 12, 1983; JP-A-57 206 803 (Nippon Denki K.K.) 18.12.1982.

Japanese Patent Abstract, vol. 9, No. 9, nr. 79 (P-347) [1802], Apr. 9, 1985; JP-A-59 211 807 (Nairusu Buhin K.K.) 30.11.1984.

Primary Examiner—Stephen C. Buczinski
Attorney, Agent, or Firm—Weingarten, Schurgin, Gagnebin & Hayes

[57] ABSTRACT

An apparatus and method for measuring the distance between CRT image display and a photocell spaced apart from the CRT, including apparatus to selectively illuminate a point and a line on the image screen, and apparatus which provides a distance measurement according to the ratio of the received light for the point and the line image, respectively. The present invention provides a highly accurate, non-contacting apparatus and method for measuring distance and is inherently independent of many sources of distance measurement error. Moreover, approximations in the technique are available which provide measurement accuracy to a predetermined level. The resulting apparatus, when mounted in an optical system, provides for the accurate adjustment of the optical system parameters and components.

9 Claims, 2 Drawing Sheets

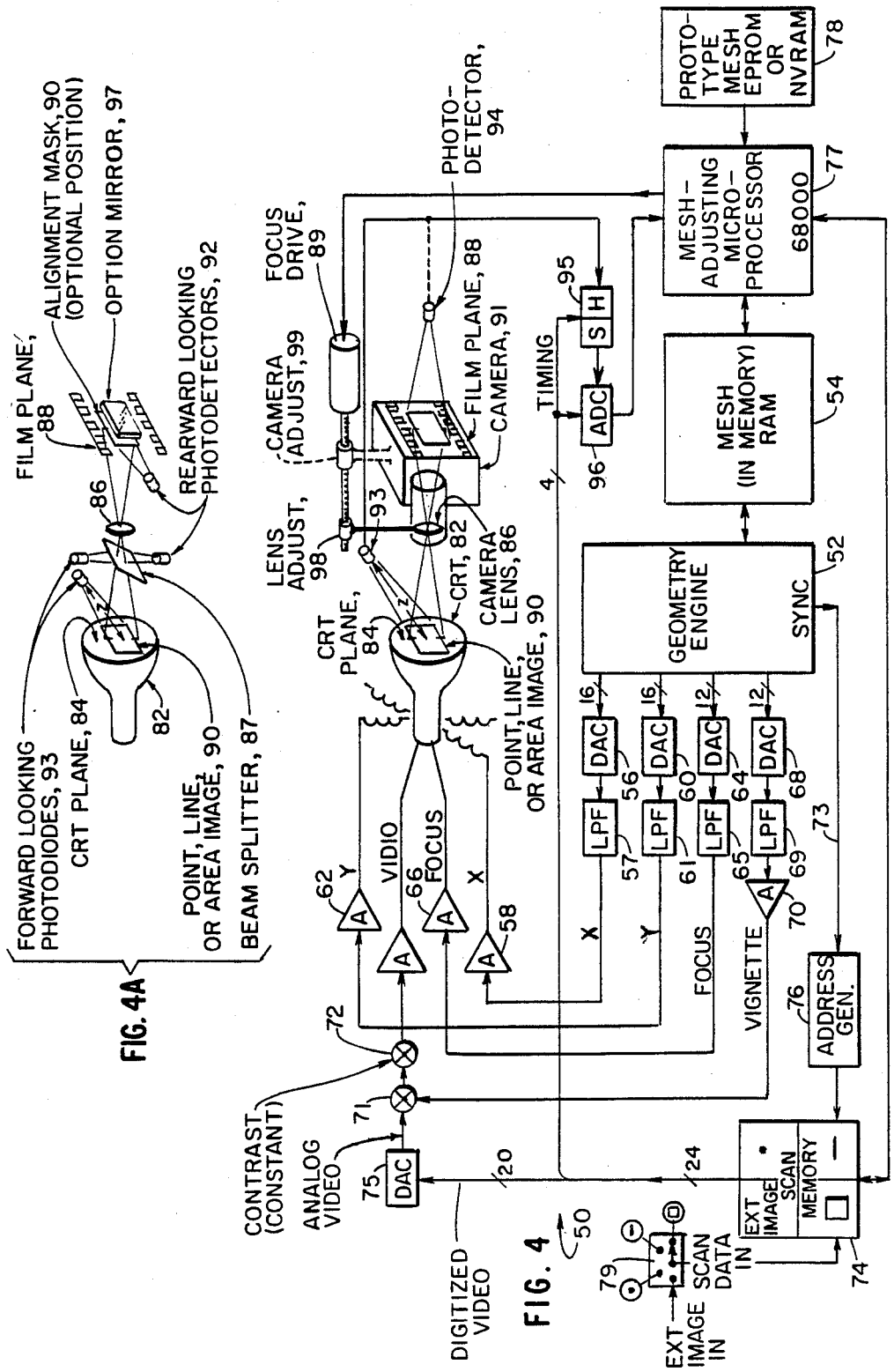

PHOTOCELL DISTANCE MEASUREMENT

This application is a continuation of application Ser. No. 07/7001,205, filed Jan. 7, 1987, now abandoned.

FIELD OF THE INVENTION

The present invention relates to optical distance measurement apparatus and methods, and in particular, an optical distance measurement apparatus and method applied to CRT imaging displays as is used in film recorders.

BACKGROUND OF THE INVENTION

CRT imaging displays measure the light output of the CRT with a photodetector. The photodetector signal is used to calibrate the brightness of the display and to adjust for aging of the CRT, temperature change and drift of operating voltages. One difficulty of this technique is that the readings from the photodetector are fairly sensitive to the distance (inversely to the square of the distance) between the detector and the phosphor of the CRT. The problem is encountered if it becomes necessary to replace the detector, the CRT, any of the mounting components, or if disassembly of the mechanical structure is required for service or maintenance.

In the past, this problem has been dealt with by using very precise mechanical mounting that ensured repeatability of positions, or by mounting the photocell a considerable distance (several inches) from the CRT so that minor positioning errors are not significant. The first solution is expensive, and the second reduces the illumination on the detector and requires a more sensitive measuring device. The technique described here avoids both of these problems.

SUMMARY OF THE INVENTION

The apparatus and method according to the present invention provides a mechanism for the measurement of the distance between a CRT phosphor and a photodetector, wherein the photodetector is located in the fixed relationship to components of an optical system. The CRT selectively provides a first and a second image, wherein the images have a different number of dimensions, e.g., a point, a line and an area. The relative intensity of the images for two of the three images is measured, and the intensity is calculated from the ratio of the intensity signals. The information provided according to the present invention is incorporated into an image recorder described in related U.S. Pat. No. 4,754,384 entitled IMAGE RECORDER HAVING AUTOMATIC ALIGNMENT METHOD AND APPARATUS, which is being filed concurrently with this application and is incorporated by reference.

BRIEF DESCRIPTION OF THE DRAWING

These and further features according to the present invention will be better understood by reading the following detailed description, taken together with the drawing, wherein:

FIG. 4 is a block diagram of one embodiment of the system incorporating the present invention; and FIG. 4A is an alternate embodiment of the alignment of the optical elements of FIG. 4.

DETAILED DESCRIPTION OF THE INVENTION

Figure 1:
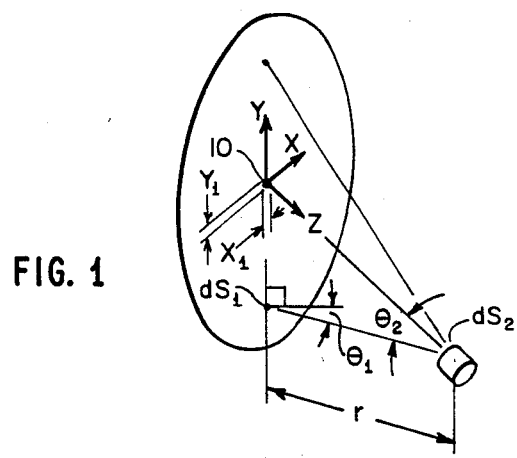
FIG. 1 is a geometrical illustration of the relationship of the CRT imaging display and the photodetector, including a single point illumination thereon.

A coordinate system is shown in FIG. 1. The X and Y axes are parallel to the surface 84 of the CRT phosphor which is located at $Z=0$. The photodetector 93 is centered above the origin at an unknown distance Z above the phosphor. Next, using Lambert's cosine law of emission, we define L as the uniform luminescence of the phosphor, (comprising the surface of the geometric patterns) $ds_1$ is an element of the phosphor surface 84, $ds_2$ is an element of the detector 93, r is the distance between the two elements, and $\Theta_1$ and $\Theta_2$ are the angles between the elements and the line connecting them (see FIG. 2). From this, the illumination (energy per unit area) dE of $ds_2$ is given by:

$$dE = \frac{L \, ds_1 \cos \Theta_1 \cos \Theta_2}{r^2} \quad (1)$$

If the photodetector 93 is parallel to the surface of the phosphor, then $\Theta_1 = \Theta_2$, and this value will be called $\Theta$.

From this equation, we can see that if we illuminate ony the single point 10, FIG. 1, at the origin, then the illumination at the photodetector 93 is proportional to:

$$\frac{L}{Z^2} \quad (2)$$

Figure 2:
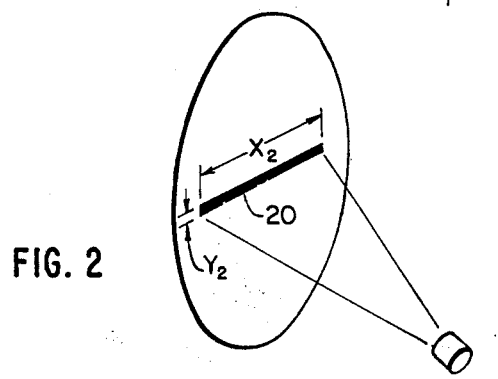
FIG. 2 is an illustration of a single line on the CRT image display of FIG. 1.

Next, if we illuminate a single line 20, FIG. 2, at $Y=0$, we can calculate the illumination at the photodetector 93 as proportional to:

$$\frac{\pi L}{2Z} \quad (3)$$

Figure 3:
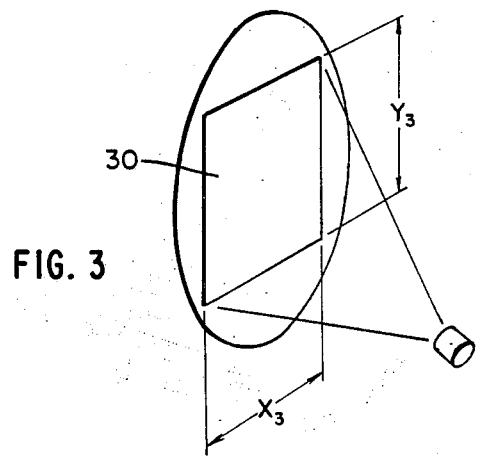
FIG. 3 is an illustration of the illumination of an area on the X-Y plane of the CRT of FIG. 1.

Finally, if we illuminate the entire X-Y plane, 30 FIG. 3, we can calculate the illumination at the photodetector 93 as proportional to:

$$\pi L \quad (4)$$

In reality, it is impossible to illuminate a single point, line, or the entire X-Y plane. The limitation of the dot size of the CRT and the physical limits on the CRT size prevent this. However, we may make some reasonable approximations.

For example, instead of illuminating a single point, assume that a small rectangular area of dimensions $X_1$ and $Y_1$ centered at the origin is used. Evaluating equation (1) shows that the intensity at the detector 93 is approximately:

$$\frac{L X_1 Y_1}{Z^2} = R_1 \quad (5)$$

and the error in this approximation is less than $$\frac{1}{2}\left(\frac{X_1^2 + Y_1^2}{Z^2}\right) \quad (6)$$

Similarly, instead of illuminating a line, assume that a long rectangular area of dimension $X_2$ by $Y_2$ centered at the origin is used ($X_2$ is much greater than $Y_2$). Evaluating equation (1) shows that the intensity at the detector 93 is approximately:

$$\frac{\pi L Y_2}{2Z} = R_2 \quad (7)$$

and the error in the approximation is less than $$\frac{1}{4}\left(\frac{Y_2}{Z}\right)^2 + \frac{8}{3\pi}\left(\frac{Z}{X_2}\right)^2 \quad (8)$$

Finally, instead of illuminating the entire X-Y plane, assume that a large rectangular area of dimension $X_3$ by $Y_3$ centered at the origin is used. Evaluating equation (1) shows that the intensity at the detector is approximately:

$$\pi L = R_3 \quad (9)$$

and the error in the approximation is less than $$\frac{8}{3\pi}\left(\frac{Z^2}{X_3^2} + \frac{Z^2}{Y_3^2}\right) \quad (10)$$

Thus it can be seen that if some advance knowledge is available on the expected range of values of z, and an acceptable error in the measurement is chosen, then one can easily choose sizes of the patterns to be drawn on the CRT. For example, if an accuracy of one percent is desired when z is between $z_{min}$ and $Z_{max}$, then one could choose:

$$X_1 \text{ and } Y_1 < \frac{Z_{min}}{10} \quad (11)$$

$$X_2 > 10 Z_{max} \quad (12)$$

$$Y_2 < \frac{Z_{min}}{50} \quad (13)$$

$$X_3 \text{ and } Y_3 > 14 Z_{max} \quad (14)$$

It is now easy to calculate Z by means of any of the following equations:

$$\frac{R_2}{R_1} = \frac{\pi Y_2 Z}{2 X_1 Y_1} \propto Z \quad (15)$$

$$\frac{R_3}{R_2} = \frac{2Z}{Y_2} \propto Z \quad (16)$$

$$\frac{R_3}{R_1} = \frac{\pi Z^2}{X_1 Y_1} \propto Z^2 \quad (17)$$

From the above, it is easily seen that if one performs any two of the three measurements, one can obtain the value of Z. This value is not in any particular physical units (e.g., inches). The conversion factor to physical units is not easily calculated since it depends on the sensitivity of the detector as a function of $\Theta$ and on how closely the phosphor resembles a uniformly diffusing surface. This conversion factor is seldom needed, but if it is necessary, it may be determined by once taking measurements on a setup with a known value of Z.

Other errors in the measurements result if the CRT phosphor does not approximate a uniformly diffusing surface, or if the sensitivity of the photodetector varies significantly with the angle of light source. If such errors are significant, then one may create a setup for measuring the ratio of the two selected patterns at various measured distances (values of z). Then reading from an unknown system may then be looked up in this table to determine the correct value. This technique is also useful if limitations on the CRT size prevent drawing the long lengths necessary for the line and plane patterns.

Moreover, this technique may also be used for measuring the thickness of the CRT faceplate on an assembled CRT. This value is important for film recorders since the glass causes the apparent position of the phosphor to be closer to the camera lens that it really is (by approximately one third the thickness of the glass). Thus the variability in faceplate thickness which require adjustments (via drive 89 and processor 77) in lens focus (98) and/or camera positioning (99) are determined according to the process of the present invention.

A block diagram 50 in FIG. 4 provides further details of the apparatus according to one embodiment of the present invention and includes a cathode ray tube (CRT) 82 which provides an image on an image plane which for this embodiment is also a CRT plane 84. The image 90 on the CRT plane 84 is generated from scan data selectively (74) stored in a scan memory 74 and includes a point, a line, an area and and externally defined image. The scan memory 74 provides 20 bits of digitized RGB video to digital-to-analog converter (DAC) 75, which provides an analog video output and four bits of control timing to the analog-to-digital converter (ADC) 96, the integrator reset circuit, and the sample and hold (S/H) circuit 95 which digitizes the photodetector 94 signal. The scan memory 74 addresses are provided by an address generator 76 synchronized by the geometry engine 52 so that the operation of the geometry engine corresponds to the image (90) generated from the scan memory 84. The scan memory is controlled by a microprocessor, which may include a microprocessor 77. The system is aligned according to an alignment mask point line and area image 90 inserted at the CRT plate 84. A movable spot is provided on the CRT plane 84 of the CRT 82. The portion of the light which is provided by the selected image 90 is received by a photodetector 94.

Examples of further alternate embodiments in alignment mask and distance measurement images position are shown in FIG. 4A. The selected point, line, area or alignment mask image 90 can be formed by an overlay on the CRT plane 84, and the photodetector 94 or 93 receives light directly or indirectly from a beam-splitting or movable mirror 87 at a distance Z, from the CRT plane. The selected image 90 may also be located at the film plane 88, such that light reflected from a mask having a selected point, line or area image is received by a rearward-looking photodetector 95, either directly or indirectly from a beam splitter 87 in the optical path. Moreover, a mirror 97 may be introduced at the film plane 84 88 to reflect light to the photodetector 95 from the overlay or selected image 90.

A signal from the photodetector 94 or 93 is received by sample-and-hold 92 and converted to a digital number by an analog-to-digital converter (ADC) 96. Photodetector 94 measurements provide the information required for system tuning or adjustment ROM. They are made by positioning the selected point line, or area image at a target point on the CRT and monitoring the light amplitude at the photodetector. The resulting digital signal is received by the microprocessor 77. The geometry engine is controlled to produce the selected image 90 to coincide with an external signal, including a sync signal on lead 73. The geometry engine provides an x deflection signal which is received and converted to an analog signal by DAC 56. The analog signal is received and filtered by a low pass filter (LPF) 57 and amplified by an amplifier 58 and received by the deflection coils or other deflection device by the CRT. Similarly, the geometry engine 52 provides a y deflection signal which is converted by DAC 60 filtered by the LPF 61 and amplified at 62. The focus signal is also generated by the geometry engine 52 and converted to an analog signal by DAC 64, filtered by the LPF 65 and drives the appropriate CRT grid by amplifier 66. Thus, according to the present invention, when the distance Z is calculated, the image 90 provided from the scan memory 74 selectively comprises an area, a line and a point. The intensity is detected by the photodetector 93 or 94 and, after digitization, processed by microprocessor 77 such as according to equations 15, 16 and 17, above.

Other embodiments and modifications of the present invention by one skilled in the art, such as alignment of a laser, rather than a CRT-based image system, are within the scope of the present invention, which is not to be limited except by the claims which follow.

I claim:

1. Distance measurement apparatus comprising:
   means for alternately providing a first and a second source of radiation, wherein
   said first source and said second source each provide distinct geometric patterns of radiation having different number of dimensions, said geometric patterns being selected from two different one of a zero-, one- and two-dimensional image comprising a point, a line and a solid planar image, respectively, and
   said first and said second source of radiation sharing a common plane;
   a detector providing two intensity signals in response to received incident radiation from each of said means for providing a first and second source of radiation; and
   means for calculating the distance according to the intensity signals provided according to said first and second sources of radiation and providing a corresponding distance related signal.

2. The distance measurement apparatus of claim 1, wherein
   said first source approximates a point source theoretically of zero dimension having actual dimensions $X_1$, $Y_1$ and providing an intensity $R_1$ at the detector,
   said second source approximates a line source theoretically at one dimension having actual dimensions $X_2$, $Y_2$ and providing an intensity $R_2$ at the detector, and
   said means for calculating provides the distance, Z, according to the equation:

$$\frac{R_2}{R_1} = \frac{\pi Y_2 Z}{2 X_1 Y_1} \propto Z$$

3. The distance measurement apparatus of claim 1, wherein
   said first source approximates a line source of one dimension, and
   said second source approximates an area source of two dimensions.

4. The distance measurement apparatus of claim 1, wherein
   said first source approximates a point source of zero dimension, and a said second source approximates an area source of two dimensions.

5. The distance measurement apparatus of claim 1, wherein
   said means for providing a first and a second source of radiation comprises a CRT display system.

6. The distance measurement apparatus of claim 1, wherein
   said means for calculating includes means for compensating for angular displacement of said detector and said means for providing a first and a second source of radiation, and said means for compensating provides the illumination (per unit area) dE of an element of the detector, $ds_2$ according to the equation:

$$dE = \frac{L \, ds_1 \cos \theta_1 \cos \theta_2}{r^2}$$

where L is the uniform luminescence of the surface of the geometric patterns, $ds_1$, is an element of the surface of the geometric patterns, $\theta_1$ and $\eta_2$ are the angles between the elements $ds_1$ and $ds_2$ and the line connecting the elements $ds_1$, and $ds_2$ and r is the distance between the two elements $ds_1$ and $ds_2$.

7. A method of measuring distance between a surface and a point location comprising the steps of:
   providing a point source of radiation at said surface;
   measuring the intensity of the radiation at said point location;
   providing a line source of radiation at said surface;
   measuring the intensity of the radiation at said point location; and
   calculating the distance according to the ratio of the measured radiation intensity from the point source and from the line source.

8. A method of measuring distance between a surface and a point location comprising the steps of:
   providing a point source of radiation at said surface;
   measuring the intensity of the radiation at said point location;
   providing an area source of radiation at said surface;
   measuring the intensity of the radiation at said point location; and
   calculating the distance according to the ratio of the measured radiation intensity from the point source and from the area source.

9. A method of measuring distance between a surface and a point location comprising the steps of:
   providing a line source of radiation at said surface;
   measuring the intensity of the radiation at said point location;
   providing an area source of radiation at said surface;
   measuring the intensity of the radiation at said point location; and
   calculating the distance according to the ratio of the measured radiation intensity from the line source and from the area source.

* * * * *